US009862257B1

(12) United States Patent
Kozlowski et al.

(10) Patent No.: US 9,862,257 B1
(45) Date of Patent: Jan. 9, 2018

(54) TONNEAU COVER ASSEMBLY AND CLAMP WITH GRASPING TETHER (71) Applicant: Extang Corporation, Ann Arbor, MI (US)

(72) Inventors: Brian Paul Kozlowski, Canton, MI (US); Mark Alan Hickey, Howell, MI (US)

(73) Assignee: Extang Corporation, Ann Arbor, MI (US)

( * ) Notice: Subject to any disclaimer, the term of this patent is extended or adjusted under 35 U.S.C. 154(b) by 0 days.

(21) Appl. No.: 15/205,957

(22) Filed: Jul. 8, 2016

(51) Int. Cl.
*B60J 7/14* (2006.01)
*B60J 7/19* (2006.01)
*B60P 7/02* (2006.01)

(52) U.S. Cl.
CPC ............... *B60J 7/198* (2013.01); *B60J 7/141* (2013.01); *B60P 7/02* (2013.01)

(58) Field of Classification Search
CPC ... B60J 7/198; B60J 7/104; B60J 7/141; B60J 7/1607; B60J 7/185; B60P 7/02; B60P 7/04
USPC ............................... 296/198, 100.07, 100.16
See application file for complete search history.

(56) References Cited

U.S. PATENT DOCUMENTS

| 6,427,500 | B1* | 8/2002 | Weinerman | B60J 7/198 292/196 |
| 7,188,888 | B2 | 3/2007 | Wheatley et al. | |
| 7,334,830 | B2 | 2/2008 | Weldy | |
| 8,714,622 | B2 | 5/2014 | Spencer et al. | |
| 8,960,765 | B2 | 2/2015 | Facchinello | |
| 2006/0267370 | A1* | 11/2006 | Wheatley | B60J 7/104 296/100.15 |
| 2010/0270824 | A1* | 10/2010 | Yue | B60J 7/198 296/100.07 |
| 2011/0260493 | A1* | 10/2011 | Xu | B60J 7/104 296/100.07 |
| 2012/0274091 | A1* | 11/2012 | Yue | B60J 7/141 296/100.04 |
| 2012/0274092 | A1* | 11/2012 | Yue | B60J 7/141 296/100.07 |
| 2014/0042769 | A1* | 2/2014 | Spencer | B60J 7/104 296/100.16 |
| 2016/0096423 | A1* | 4/2016 | Facchinello | B60J 7/106 292/256 |
| 2017/0066311 | A1* | 3/2017 | Facchinello | B60J 7/198 |
| 2017/0087968 | A1* | 3/2017 | Smith | B60J 7/198 |

* cited by examiner

*Primary Examiner* — Gregory Blankenship
(74) *Attorney, Agent, or Firm* — Harness, Dickey & Pierce, P.L.C.

(57) ABSTRACT

A tonneau cover system can include a cover sized and shaped to cover the truck cargo box and a spring clamp designed to secure the cover to the truck cargo box. The spring clamp can include a rod connected to the cover. The rod can have a rod axis. A clamp body can be rotatably and slidably mounted on the rod. The clamp body can include a pair of oppositely disposed catches spaced apart from the rod axis. The catches can extend in a catch length direction intersecting the rod axis at a first angle. A grasping tether can be attached to the clamp body for manually sliding the clamp body along the rod in a direction away from the cover. Due to the flexible nature of the grasping tether, potential interference of the clamp with cargo in the cargo box can be significantly reduced.

16 Claims, 8 Drawing Sheets

TONNEAU COVER ASSEMBLY AND CLAMP WITH GRASPING TETHER

FIELD

The present disclosure relates to tonneau cover assemblies, including clamps for coupling the tonneau cover to a truck cargo box.

BACKGROUND

This section provides background information related to the present disclosure which is not necessarily prior art.

Tonneau covers can be used to cover the cargo box of a pickup truck to protect cargo therein, to prevent dirt, debris and other environmental contaminants from entering the cargo box, and to improve the aesthetic quality of the cargo box and truck. Such tonneau covers can be coupled to the side wall of the pick-up truck by a clamp extending downwardly from the tonneau cover that can be positioned to engage a downwardly extending flange or other portion of the side wall in a locked position.

Such tonneau cover clamps must be rotated or otherwise positioned with respect to the downwardly extending side wall flange while in an unclamped configuration. The overall unclamped rigid length of some clamps is typically so large that cargo within the cargo box can interfere with, or even prevent, the proper positioning of the clamp. After proper positioning, the clamp must be moved from its unclamped configuration to a clamped configuration. During such movement, the overall intermediate rigid length of some clamps can be so large that cargo within the cargo box can interfere with or prevent movement of the clamp into the clamped configuration.

In the clamped configuration, the overall clamped rigid length of some clamps typically extends appreciably below the lower edge of the downwardly extending flange and into the cargo box. As a result, the clamp can engage cargo within the cargo box which can interfere with cargo insertion or removal. In addition, in-transit movement of cargo can result in unwanted engagement of the cargo with the clamp. In extreme cases, cargo and clamp engagement could potentially result in damage to any of the cargo, clamp, tonneau cover and/or the truck side wall.

As one example, a spring clamp typically includes a rigid grasping handle that contributes significantly to the overall rigid length of such clamps. In addition, such rigid grasping handles result in rigid members of the clamp extending appreciably below the lower edge of the downwardly extending flange and into the cargo box in the clamped configuration. Applicant has identified and minimized such problems by limiting at least one of the overall unclamped, intermediate, and clamped rigid lengths, and the distance rigid elements, such as a rigid grasping handle, extends below the lower edge of the downwardly extending side wall flange.

SUMMARY

This section provides a general summary of the disclosure, and is not a comprehensive disclosure of its full scope or all of its features.

In accordance with one aspect of the present invention, tonneau cover assembly for a truck cargo box can include a cover sized and shaped to cover the truck cargo box and a clamp designed to secure the cover to the truck cargo box. The clamp can include a rod connected to the cover. The rod can have a rod axis. A clamp body can be rotatably and slidably mounted on the rod. The clamp body can include a catch spaced apart from the rod axis. The catch can extend in a first direction intersecting the rod axis. A grasping tether can be attached to the clamp body for manually sliding the clamp body along the rod in a direction away from the cover.

In accordance with one aspect of the present invention, tonneau cover assembly for a truck cargo box including a side wall can include a cover sized and shaped to cover the truck cargo box and a clamp designed to secure the cover to the side wall of the truck cargo box. The clamp can include a rod that can have a first end pivotally connected to the cover and a distal end apart from the cover. The rod can have a rod axis. A clamp body can be rotatably and slidably mounted on the rod. The clamp body can include a first catch spaced apart from the rod axis in a first direction intersecting the rod axis. The clamp body can further include a second catch spaced apart from the rod axis in a second direction opposite the first direction. A spring can be adjacent the distal end of the rod and biasing the clamp body along the rod axis in a direction toward the cover. A tether can be attached to the clamp body for sliding the clamp body along the rod in a direction away from the cover. The tether can be a strap having a greatest cross-sectional dimension. The direction of the greatest cross-sectional dimension can extend perpendicular to the first and second directions and to the rod axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

FIGS. 1-8 illustrate one exemplary tonneau cover system 10 for covering a truck bed or cargo box 11 in accordance with the present disclosure. In some cases, the truck bed or cargo box 11 can be part of a pickup truck 13 as shown. The cargo box 11 can include side walls 17 that can have an outer wall 16, a ledge 18 extending inboard from the outer wall 16 and a flange 20 extending downwardly from the ledge 18 and spaced inboard from the outer wall 16. The flange 20 can include a lower, or downwardly disposed or facing distal edge 22.

In some embodiments, tonneau cover 15 can include a fabric, textile or other flexible material 14 supported on a frame 31 disposed about the cargo box 11. Frame 31 can include a hinges 33 that divide the tonneau cover 15 into a plurality of sections 12 so that the tonneau cover is foldable between a deployed arrangement covering the truck box 11 (FIG. 1) and a folded arrangement wherein the sections 12 are stacked, allowing access to the truck box 11. The single dashed lines extending side-to-side from hinges 33 in FIG. 1 indicate fold lines between the sections 12. The frame 31 can comprise one or more bow members 35. The bow member can include a central rib 27 connected to the frame periphery by a connecting member 39. Alternately, the tonneau cover can comprise a plurality of generally rigid panels that are hingedly connected and form sections that are suitably deployed for covering the cargo bed and folded to allow access thereto, in which case a channel member similar to connecting member 29 can be affixed in a recess within a panel for purposes of mounting a clamp. Other tonneau cover 15 configurations are, of course, possible.

In some embodiments, member 39 can comprise a C-shaped cross-section defining a longitudinal internal channel 28 with a longitudinally extending central opening 30. The coupling member 32 can be rotatably and slidably retained within the channel 28. The clamp 26 can include an elongate member that can be a rod 34 and that can be coupled to the coupling member 32. The coupling member 32 can have a rectangular planar shape, or can have a barrel shape, or other configuration. The rod 34 can extend out of the channel 28 through the opening 30 to pivotably couple the clamp 26 to the connecting member 29. In some embodiments, the rod 34 can be a partially or fully threaded rod 34. In alternate embodiments, the connecting members 29 can comprise a rod portion extending between the central rib 27 and periphery, and the coupling member 32 of the clamp 26 can be a collar that surrounds and rides along the rod portion of such a connecting member 29.

The spring clamp 26 can include a housing or body 36 slidably mounted on the rod 34 against the biasing force of a spring 38 positioned on the rod 34. In some embodiments, the elongate member can be a threaded rod 34 and the spring 38 can be mounted on the rod 34 between a threaded nut 40 and the housing 36. The housing 36 can include a channel or catch 42 positioned to receive the downwardly disposed distal edge 22. As illustrated, the clamp body 36 can include a pair of oppositely disposed catches 42. The position of the clamp body 36 along the threaded rod 34 can be adjusted by repositioning the threaded nut 40 as required to accommodate for different overall lengths of different flanges 20 of different truck side walls 17.

In some embodiments, the clamp body 36 can include a surface grasping feature 44, which can be designed to provide added friction when the body 36 is grasped by a user during movement between the latched and unlatched position and against the biasing force of the spring 38. For example, such a surface grasping feature 44 can include a series of lines or other features that serve to roughen the surface to provide a surface of the clamp body 36 with added grasping friction.

The spring clamp 26 further includes a grasping tether 48 attached to the clamp body 36. The grasping tether 48 can be formed of a strap member or other flexible material. When the grasping tether 48 extends below the downwardly disposed distal edge 22 of the flange 20, its flexible nature reduces the possibility of a problematic interaction or contact between the 26 and the cargo within the cargo box 11 of the truck 13.

In some embodiments, pins 52 can be used to couple the grasping tether 48 to the clamp body 36. For example, the tether 48 can include a strap having closed loops 54 provided at opposite ends of the strap 48. The pins 52 can extend through the closed loops 54 of the strap 48 and through apertures 56 in the clamp body 36 to couple the grasping tether 48 to the clamp body 36. In some cases, the closed loops can be formed by sewing or otherwise joining necessary portions of the strap 48 together at a central joining region 58. Thus, the grasping tether 48 can have a fully or partially closed configuration, which reduces the size of any open loop portions 54, 60, which can also reduce the possibility of a problematic interaction or contact between the clamp 26 and the cargo within the cargo box 11 of the truck 13.

Figure 5:
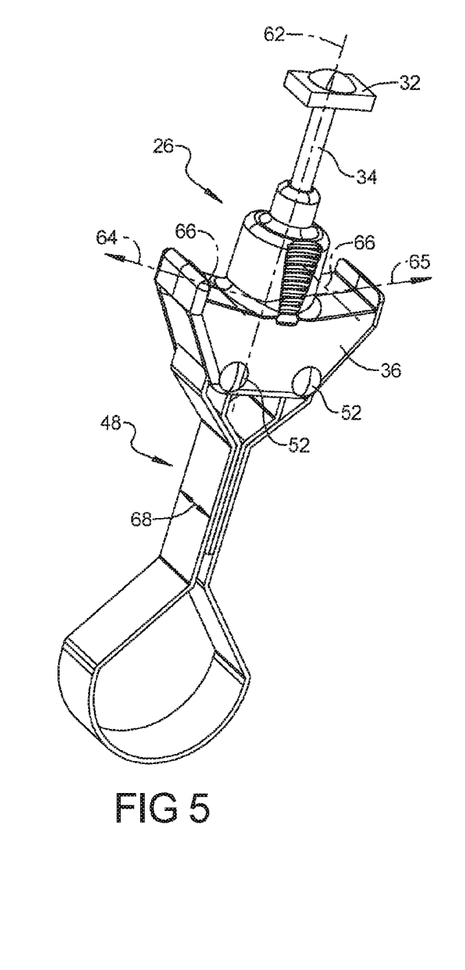
FIG. 5 is a perspective view of the clamp of FIG. 2.
Figure 6:
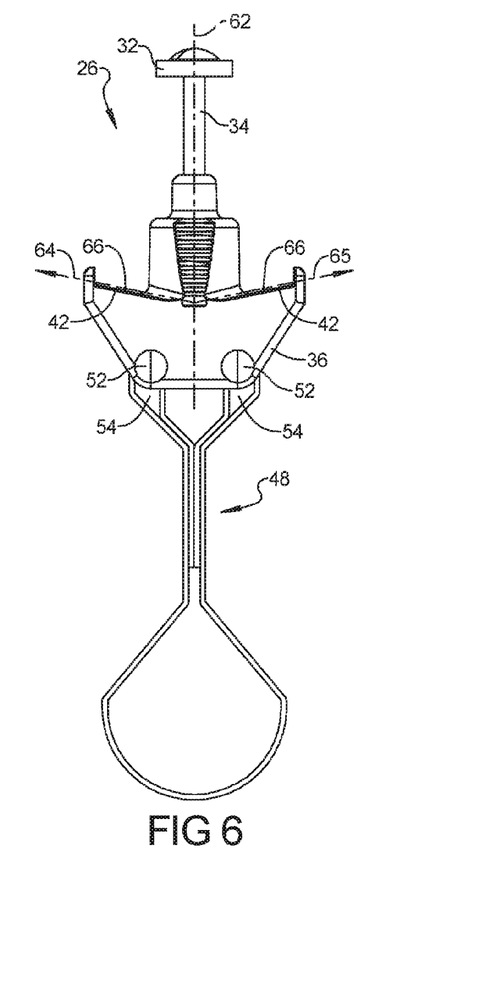
FIG. 6 is a side elevation view of the clamp of FIG. 2.
Figure 7:
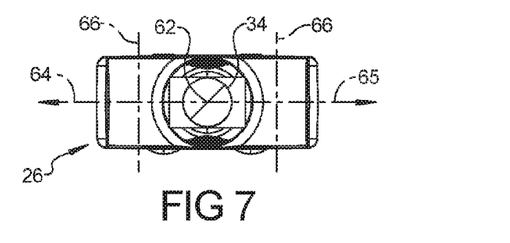
FIG. 7 is a top plan view of the clamp of FIG. 2.
Figure 8:
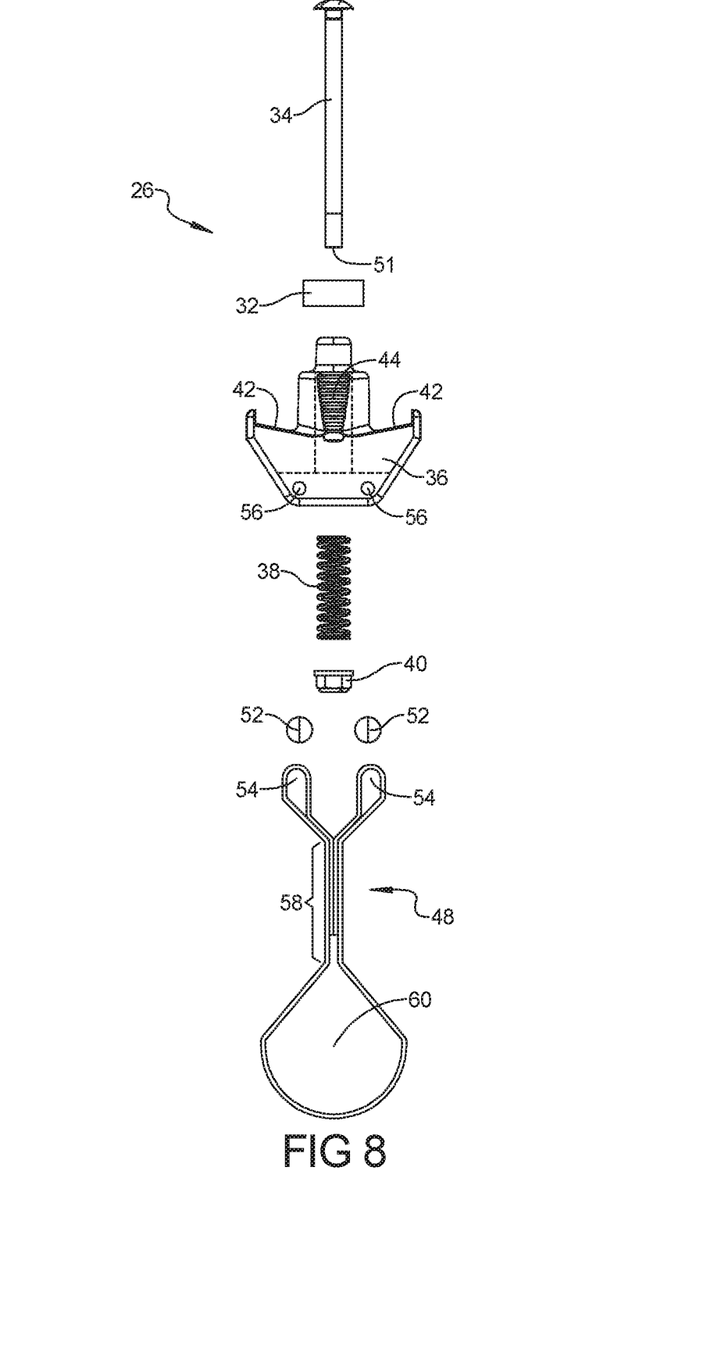
FIG. 8 is an exploded view of the clamp of FIG. 2.

With particular reference to FIGS. 5-7, the rod 34 can define a central, longitudinal rod axis 62. The catches 42 can be spaced apart from the rod axis 62 and can extend along or in a catch width axis or direction 66. One catch 42 can be spaced apart from axis 62 in a first direction 64, and the other catch can be spaced apart from axis 62 in a second direction 65 that can be generally opposite the first direction 64.

Each catch 42 can also extend along or in a catch width axis or direction 66 that can be parallel to each other. Also, the catch axis 66 can be parallel to the central or main axis of the pins 52. In some embodiments, the grasping tether 48 can have a primary or greatest cross-sectional dimension 68 that can extend parallel to the catch width axis or direction 66.

Operation of the spring clamp 26 can be described with respect to the example clamp 26 of FIGS. 1-8. To clamp the tonneau cover 15 to the side wall 17 of the cargo box 11 a user can grasp the grasping tether 48 and, if necessary, can position the clamp 26 adjacent the flange 20 of the side wall 17. Knowing the orientation of the grasping tether 48 relative to the catches 42, the user can properly orient the clamp (FIG. 2) relative to the flange 20 of the side wall 17 by feel. For example, when the greatest cross-sectional dimension 68 of the grasping tether 48 extends in a direction perpendicular to the catch length direction 64, a user can readily orient one of the catches 42 properly relative to the distal edge 22 of the flange 20 of the side wall 17. This example clamp 26 includes two oppositely oriented catches 42, so any time the greatest cross-sectional dimension 68 of the grasping tether 48 is aligned parallel to the distal edge 22, one of the catches 42 is properly oriented. Thus, there is no need for the user to see the clamp 26 during the clamping operation.

A user can then pull down on the grasping tether 48 against the biasing force of the spring 38 so that the clamp body 36 moves away from the tonneau cover 15, and away from the proximal end 50 of the rod 34, and in a direction toward the distal end 51 of the rod 34. When the clamp body 36 is sufficiently moved in this way so that the catch 42 clears the downwardly facing distal edge 22 of the flange 20, the user can pivot the clamp 26 via coupling 32 so that the catch 42 is positioned under the flange 20 in preparation for latching.

In this position, as the user releases or reduces the downward manual force provided via the grasping tether 48, the biasing force of the spring 38 causes the clamp body 36 to move upward toward the downwardly disposed distal edge 22 of the flange 20. As such, the biasing force of the spring 38 causes the clamp body 36 to move toward the tonneau cover 15, and toward the proximal end 50 of the elongate member 34.

As should be apparent, the only upwardly directed force the clamp 26 is capable of exerting against the downwardly disposed distal edge 22 is provided by the spring 38. Thus, the maximum force that the clamp 26 can exert during the clamping operation is limited to the biasing force that the spring 38 can provide. Thus, the clamp 26 can help insure that the clamping force exerted on the flange 20 during the clamping operation is insufficient to permanently deform the flange.

When unlatching the clamp 26, a user can again manually grasp the grasping tether 48 and can pull the clamp body 36 away from the tonneau cover 15 and the proximal end 50 of the rod 34, downwardly, or toward the distal end 51 of the rod 34. Once the catch 42 can clear the downwardly disposed distal edge 22 of the flange 20, the user can pivot the clamp 26 so that the catch 42 is positioned adjacent the flange 20. In this position, continued release of the grasping force will continue to move the clamp body 36 upward, toward the proximal end 50 of the rod 34, and toward the tonneau cover 15.

Figure 1:
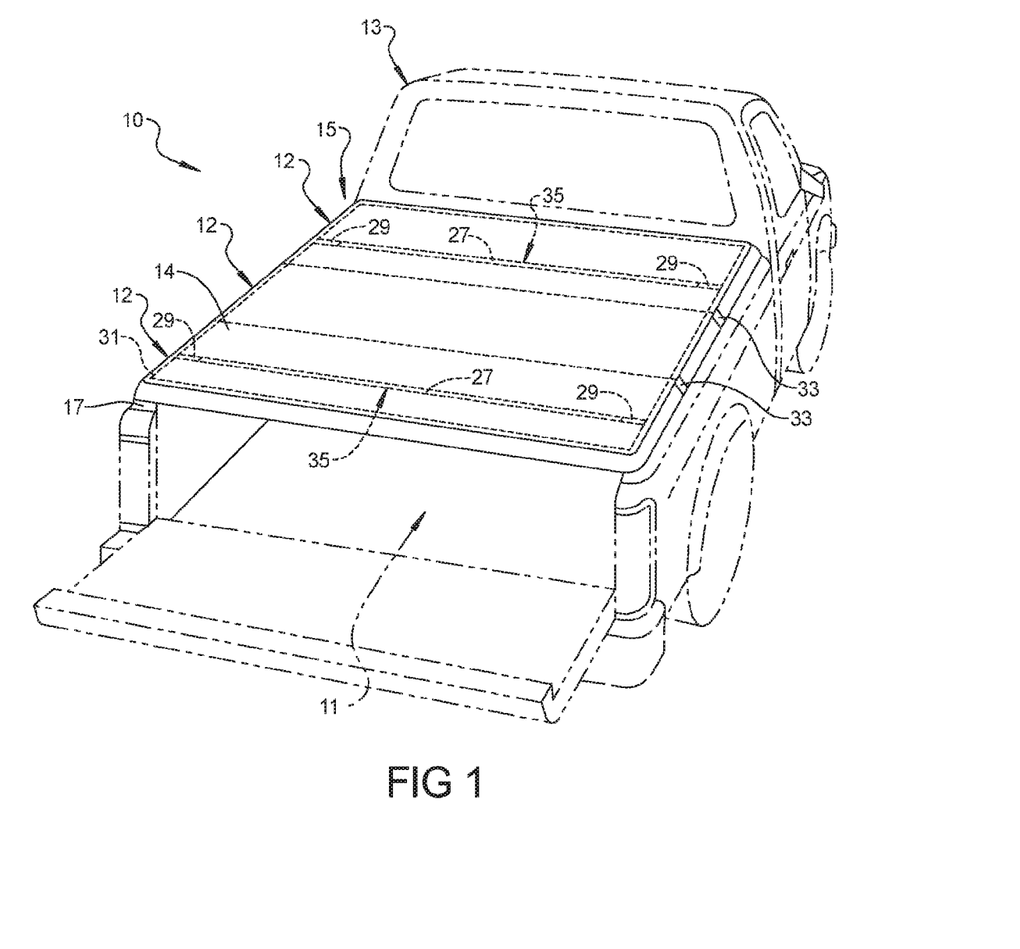
FIG. 1 is a perspective view of one example tonneau cover system with a spring clamp in accordance with the present disclosure.
Figure 2:
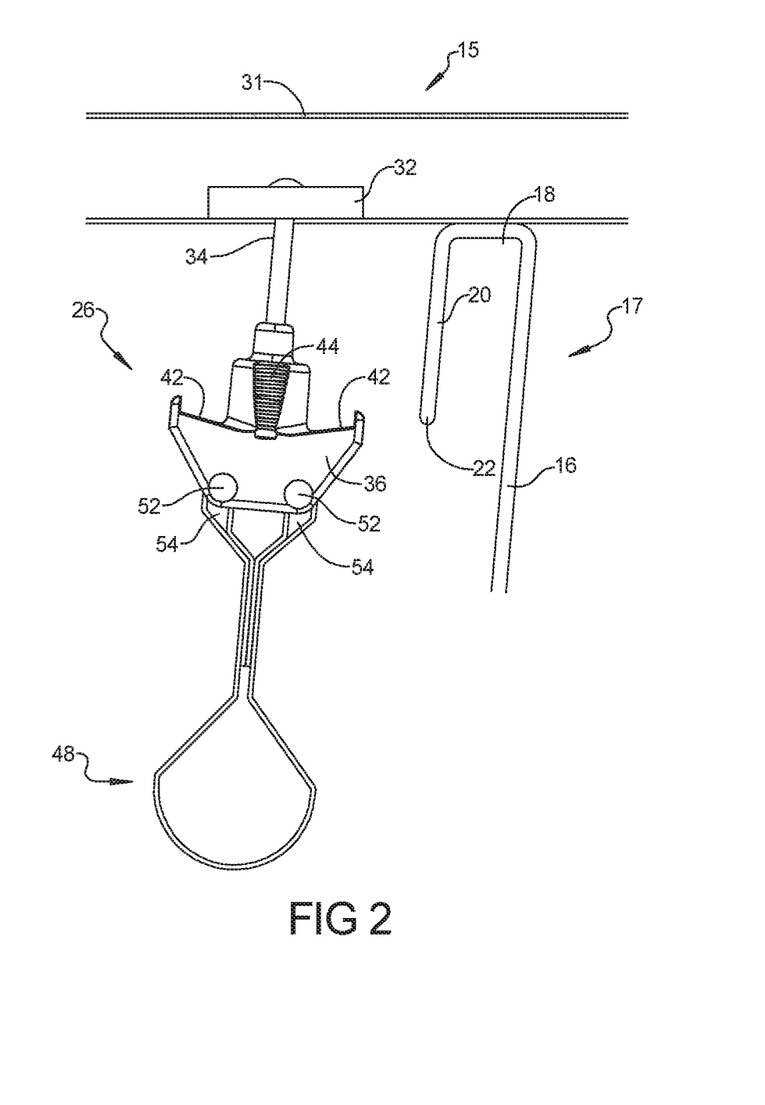
FIG. 2 is a side plan view of one exemplary embodiment of a spring clamp for the tonneau cover system of FIG. 1 in an unclamped position, with a partial cross-sectional view of a cargo box.
Figure 3:
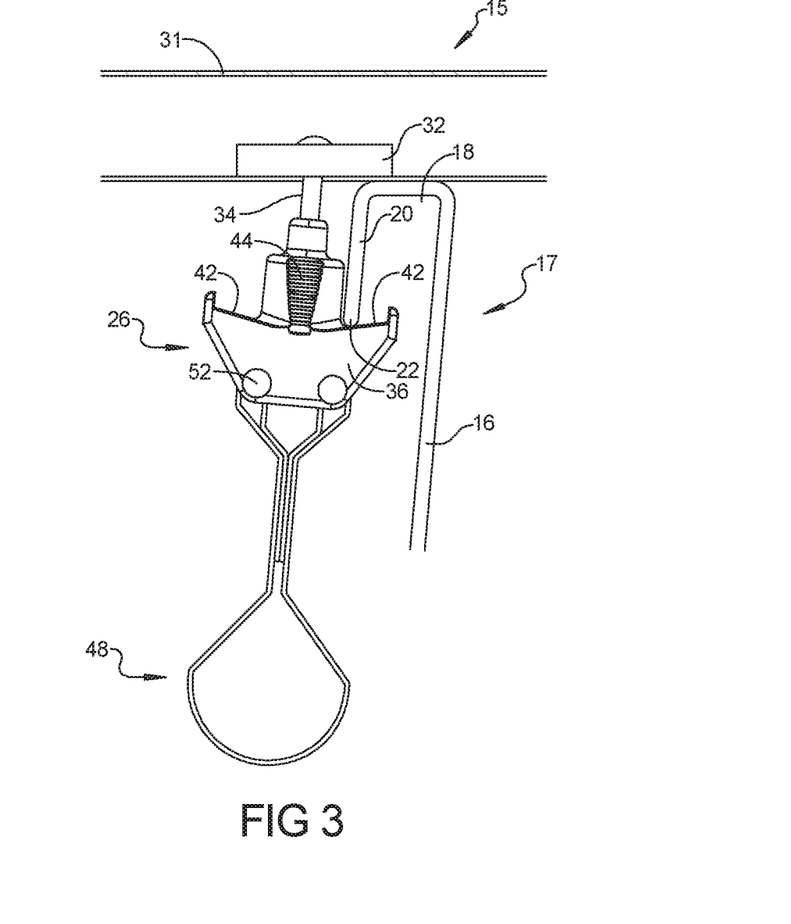
FIG. 3 is a side plan view similar to FIG. 2 illustrating the clamp of FIG. 2 in a clamped position, with a partial cross-sectional view of a cargo box.
Figure 4:
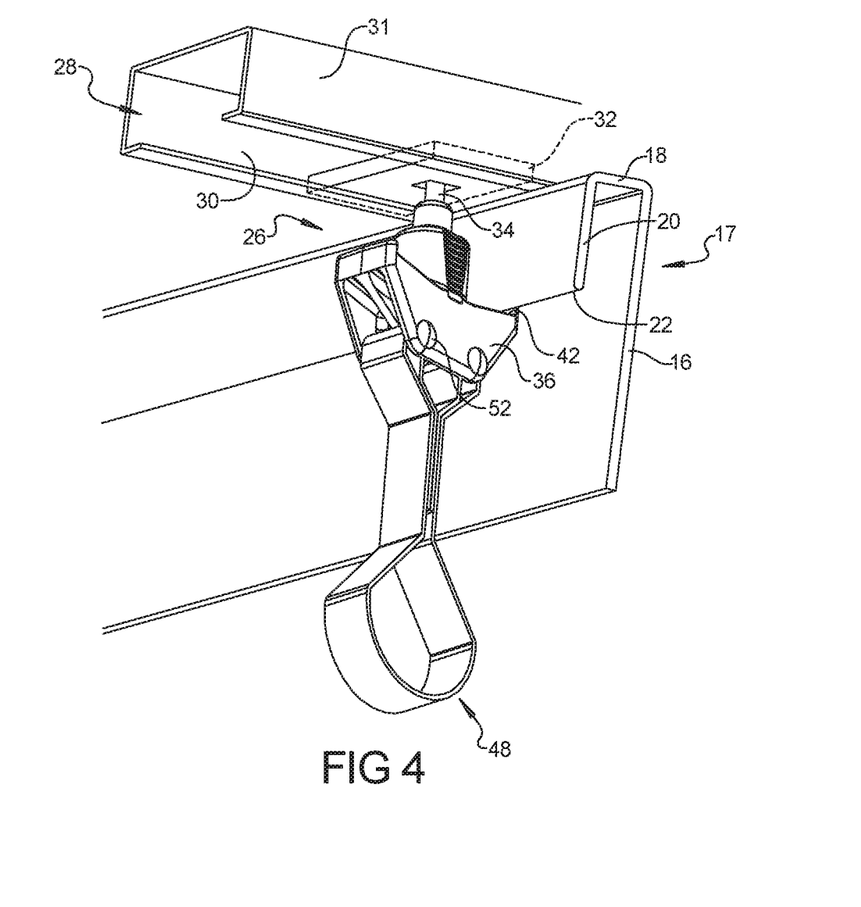
FIG. 4 is a perspective view of the clamp and partial perspective view of the cargo box of FIG. 2, with the clamp in a clamped position.

Although not to scale, FIG. 3 illustrates that the only rigid portion of the clamp 26 that extends below the downwardly disposed distal edge 22 of the flange 20 of the side wall 17 is that portion of the clamp body 36 associated with the catch 42. Although the grasping tether 48 extends below the catch 42 of the clamp body 36, the grasping tether 48 is flexible in nature. As such, the limited extent that any rigid portion of the spring clamp 26 extends below the distal edge 22, while still providing a grasping feature in the form of a flexible grasping tether 48, provides ease of operation while significantly reducing the possibility of problematic interactions between the spring clamp 26 and cargo being stored in the cargo box 11. Joining the grasping tether 48 together in the central joining region 58, or otherwise reducing the size of the any open loop portion 60 of the grasping tether 48, can further reduce the possibility of such problematic interactions.

It is possible that, in some circumstances, cargo positioned within the cargo box 11 could interfere with manual grasping and manipulation of the clamp 26 via the grasping tether 48 during a clamping or unclamping operation. In such circumstances, a user can manually manipulate and operate the spring clamp 26 using the surface grasping feature 44. The surface grasping feature 44 is positioned above the distal edge 22 of the flange 20, increasing its usability in such circumstances. The discussion above regarding positioning, orienting and operating the spring clamp 26 during clamping and unclamping operations using the grasping tether 48 can also be accomplished using the secondary surface grasping feature 44.

Figure 9:
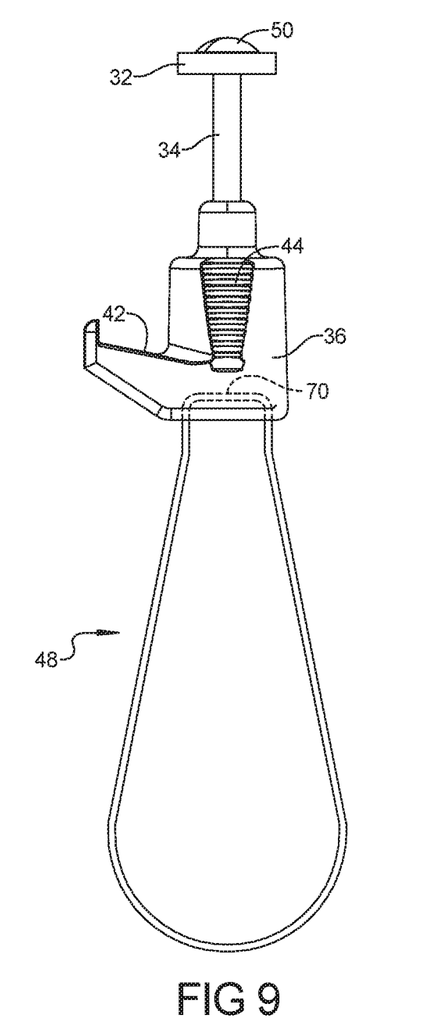
FIG. 9 is a side elevation view of another exemplary embodiment of a spring clamp for the tonneau cover system of FIG. 1.
Figure 10:
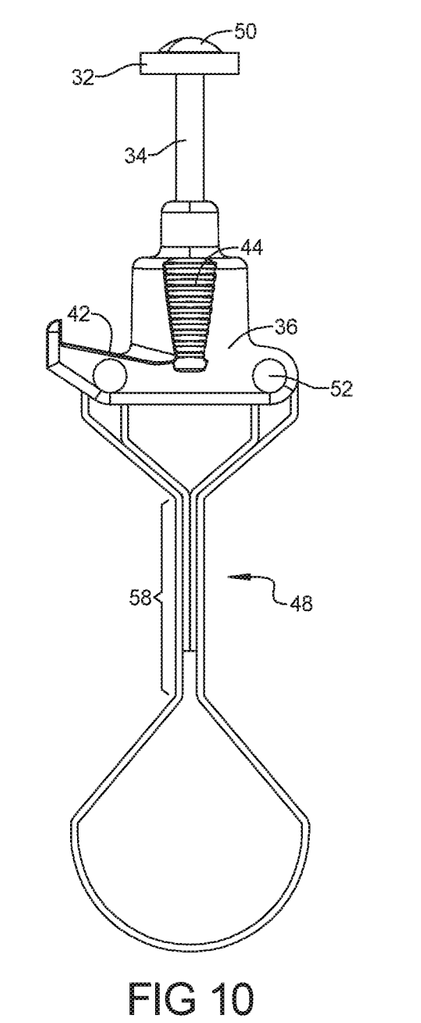
FIG. 10 is a side elevation view of yet another exemplary embodiment of a spring clamp for the tonneau cover system of FIG. 1.
Figure 11:
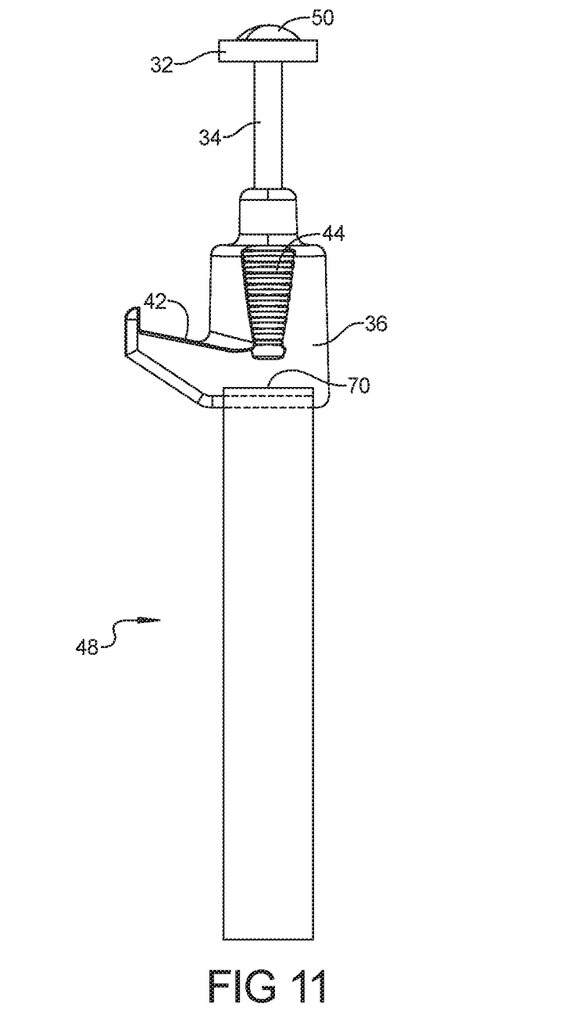
FIG. 11 is a side elevation view of another exemplary embodiment of a spring clamp for the tonneau cover system of FIG. 1

FIGS. 9, 10 and 11 illustrate a second, third, and fourth exemplary embodiment, respectively, of a clamp 26 that can be used alternatively or additionally in a tonneau cover system 10 for covering a truck bed or cargo box 11 in accordance with the present disclosure. As illustrated, the same reference numerals are used in FIGS. 9-11 as were used with respect to FIGS. 1-8 to identify corresponding elements, even though the illustrated elements may have somewhat different shapes or functions. Accordingly, much of the discussion provided above with respect to the first exemplary embodiment will not be repeated here with respect to the second and third exemplary embodiments. Thus, the description below focuses on particular structural or functional differences of these additional example embodiments, while other differences will be apparent from the drawings themselves.

As illustrated with the example spring clamps 26 of FIGS. 9-11, the coupling member 32 can have alternative shapes, such as the illustrated generally rectangular plate-shaped coupling member 32. In addition, the clamp bodies 36 can be shaped to further reduce the distance that the rigid clamp body 36, or any other rigid member of the clamp 26, extends below the distal edge 22 of the flange 20 of the side wall 17 (relative to the clamp body 36 of FIGS. 2-8) when the clamp 26 is clamped thereto. For example, as illustrated with the exemplary embodiment of FIG. 10, the pins 52 that couple the grasping tether 48 to the clamp body 36 can be moved upwardly and outwardly, adjacent the upper-most portion of the catch 42 to provide such reduced rigid member extending distance below the distal edge 22.

As illustrated with the exemplary embodiments of FIGS. 9 and 11, the grasping tether 48 can have a full open loop configuration. The grasping tether 48 can also be coupled to the clamp body 36 using alternative methods. For example, the grasping tether 48 can extend through a tether coupling slot or channel 70 extending through the clamp body 36. In the example of FIG. 9, the grasping tether 48 is oriented with the greatest cross-sectional dimension of the strap (and of the channel 70) extending parallel to the length direction 64 of the catch 42, and perpendicular to the width direction 66 of the catch. In the example of FIG. 11, the grasping tether 48 is oriented with the greatest cross-sectional dimension of the strap (and of the channel 70) extending perpendicular to the length direction 64 of the catch 42, and parallel to the width direction 66 of the catch 42. Such an orientation can make it easier to slide cargo in and out of the cargo box 11; particularly when the grasping tether 48 has a full open loop configuration.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. Similarly, although use of the terms "length" and "width" imply relative orientations with the "length" extending away from the center (e.g., rod axis), they do not imply any particular relative dimensions of the catch; e.g., that the catch is larger in the "length" direction than in the "width" direction.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover assembly for a truck cargo box, the tonneau cover assembly comprising:
    a cover sized and shaped to cover the truck cargo box; and
    a clamp designed to secure the cover to the truck cargo box, the clamp comprising:
        a rod connected to the cover and having a rod axis;
        a clamp body rotatably and slidably mounted on the rod, the clamp body comprising a catch spaced apart from the rod axis in a first direction; and
        a grasping tether attached to the clamp body for manually sliding the clamp body along the rod in a direction away from the cover.

2. The tonneau cover assembly according to claim 1, wherein the clamp is designed to secure the cover to the cargo box by engaging the catch against a distal edge of a downwardly extending inboard flange of a side wall of the truck cargo box.

3. The tonneau cover assembly according to claim 1, wherein the catch extends along a catch axis perpendicular to the first direction.

4. The tonneau cover assembly according to claim 3, wherein the tether comprises a strap having a greatest cross-sectional dimension, and wherein the direction of the greatest cross-sectional dimension extends parallel to the catch axis.

5. The tonneau cover assembly according to claim 3, further comprising a first pin having a first pin axis and a second pin having a second pin axis, the first pin and the second pin each coupled to the clamp body and extending parallel to the catch axis, and wherein the tether comprises a strap having a first closed loop at a first end extending around the first pin to couple the first end of the strap to the clamp body and a second closed loop at a second end extending around the second pin to couple the second end of the strap to the clamp body.

6. The tonneau cover assembly according to claim 1, wherein the clamp body is rotatably and slidably mounted on the rod, and wherein the catch is a first catch, and wherein the clamp body comprises a second catch spaced apart from the rod axis in a second direction generally opposite the first direction.

7. A tonneau cover assembly according to claim 1, wherein the clamp further comprises a spring biasing the clamp body along the rod axis in a direction toward a proximal end of the rod adjacent the cover.

8. A tonneau cover assembly according to claim 1, wherein the clamp body further comprises a surface grasping feature positioned to be located above a distal edge of a downwardly extending inboard flange of a side wall of the truck cargo box when the catch is clamped against the distal edge.

9. A tonneau cover assembly according to claim 1, wherein the clamp body further comprises a surface grasping feature positioned to be located above the catch.

10. A tonneau cover assembly for a truck cargo box comprising a side wall, the tonneau cover assembly comprising:
    a cover sized and shaped to cover the truck cargo box; and
    a clamp designed to secure the cover to the side wall of the truck cargo box, the clamp comprising:
        a rod having a first end pivotally connected to the cover and a distal end apart from the cover, the rod having a rod axis;
        a clamp body rotatably and slidably mounted on the rod, the clamp body comprising a first catch spaced apart from the rod axis in a first direction and extending along a first catch axis, and a second catch spaced apart from the rod axis in a second direction generally opposite the first direction and extending along a second catch axis parallel to the first catch axis;

a spring biasing the clamp body along the rod axis in a direction toward the cover; and a tether attached to the clamp body for sliding the clamp body along the rod in a direction away from the cover, the tether comprising a strap having a greatest cross-sectional dimension, wherein the direction of the greatest cross-sectional dimension extends parallel to the first catch axis and the second catch axis.

11. The tonneau cover assembly according to claim 10, further comprising a first pin having a first pin axis and a second pin having a second pin axis, each pin being coupled to the clamp body with each pin axis extending parallel to the first catch axis and the second catch axis, and wherein the strap has a first closed loop at a first end extending around the first pin to couple the first end of the strap to the clamp body and a second closed loop at a second end extending around the second pin to couple the second end of the strap to the clamp body.

12. The tonneau cover assembly according to claim 11, wherein the greatest cross-sectional dimension extends parallel to the first pin axis and to the second pin axis.

13. The tonneau cover assembly according to claim 10, wherein the first pin axis is spaced from the rod axis in the first direction and the second pin axis is spaced from the rod axis in the second direction.

14. The tonneau cover assembly according to claim 10, wherein the clamp is designed to secure the cover to the cargo box by engaging the catch against a distal edge of a downwardly extending inboard flange of a side wall of the truck cargo box.

15. A tonneau cover assembly according to claim 10, wherein the clamp body further comprises a surface grasping feature positioned to be located above a distal edge of a downwardly extending inboard flange of a side wall of the truck cargo box when the catch is clamped against the distal edge.

16. A tonneau cover assembly according to claim 10, wherein the clamp body further comprises a surface grasping feature positioned to be located above the catch.

* * * * *